J. JONSON.
Floats for Horse-Troughs, &c.
No. 157,405. Patented Dec. 1, 1874.
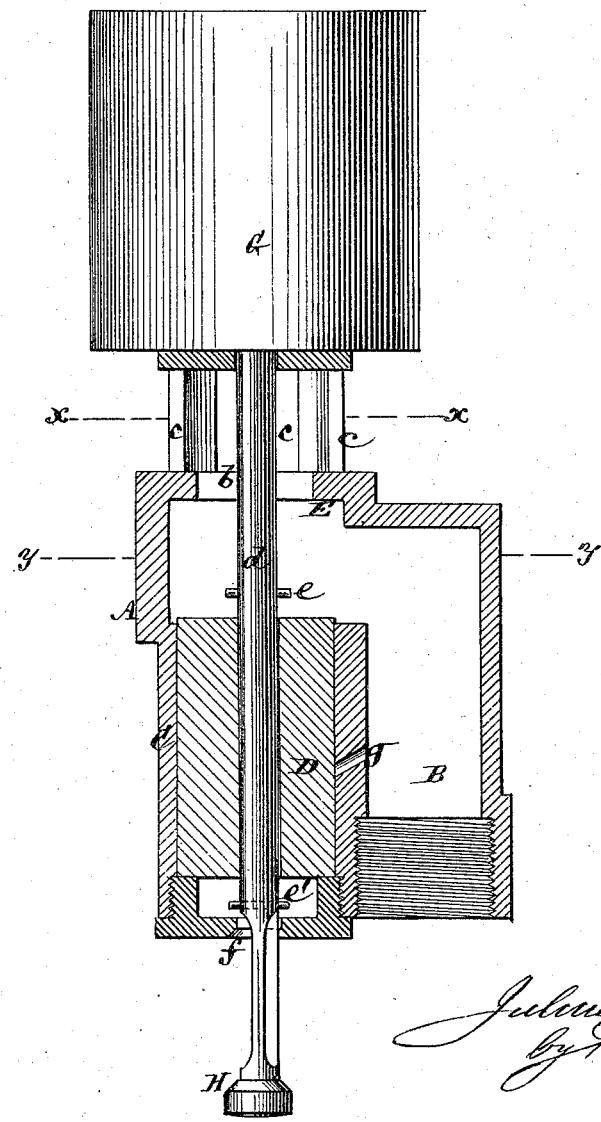
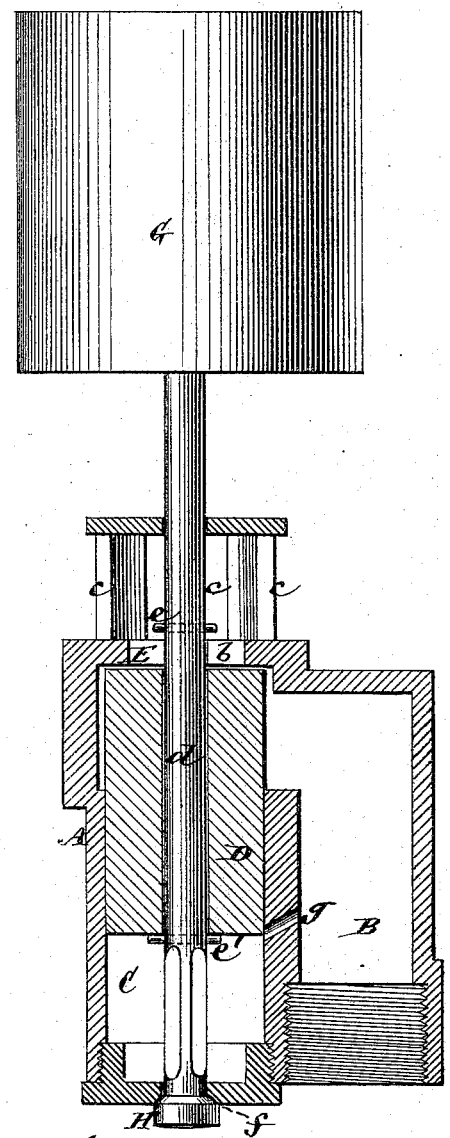
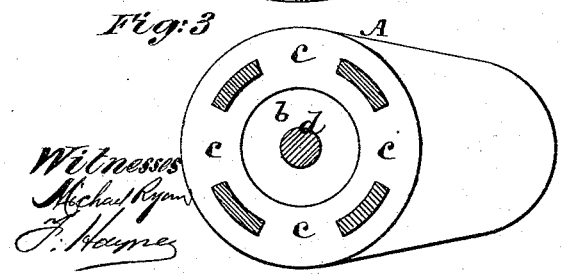
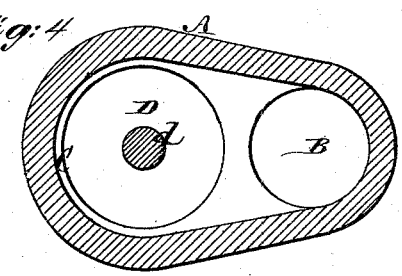

UNITED STATES PATENT OFFICE.

JULIUS JONSON, OF NEW YORK, N. Y.

IMPROVEMENT IN FLOATS FOR HORSE-TROUGHS, &c.

Specification forming part of Letters Patent No. 157,405, dated December 1, 1874; application filed May 14, 1874.

*To all whom it may concern:*

Be it known that I, JULIUS JONSON, of the city, county, and State of New York, have invented an Improvement in Float-Valves for Horse-Troughs, Drinking-Hydrants, Water-Closets, and other purposes, of which the following is a specification:

This invention consists in a float-valve for regulating the level of the water in horse-troughs, and for other purposes, in which there is combined with the float two valves, the one of which is an elongated cylindrical valve, arranged between stops on the float-stem in a free or loose manner, so that, while operating conjointly with the float to regulate or shut off the supply, it also has an independent rising and falling motion, and in the course of its action opens and closes a supplementary passage in connection with the inlet to admit or exclude water to and from the under side of said valve. The other valve, which may be permanently connected with the float-stem below, has a positive action in connection with the float, and serves to close or open the discharge-aperture for the water admitted to the under side of the main or elongated cylindrical valve. By this combination a superior pressure is brought to bear on the under side of the main valve to complete and perfect the closing of it, which, otherwise, the float, by the pressure on top of said valve, is liable to fail to do.

In the drawing, Figures 1 and 2 are vertical sections of my improved float-valve in different working positions; Fig. 3, a horizontal section on the line *x x*, and Fig. 4 a similar section on the line *y y*.

A is the main case or casting, constructed with an inlet, B, for the supply of water under pressure, and with a cylindrical chamber, C, for the main or cylindrical valve D to work up and down within, and which serves, in the course of its action, to shut off or open communication between the inlet B and the space above said valve, whereby the supply of water to the trough, through apertures *b c c*, is controlled, E being the seat against which said valve bears when closing supply to the trough or chamber to which the apparatus is applied, and in the water of which, or of a case communicating therewith, it is immersed. G is the float, which serves to buoy up and raise the valve D as the trough fills with water, and so to shut off the supply, the dropping of said valve with the falling of the float opening it again as the water diminishes in the trough. There is a liability, however, of the valve D, when lifted by the float, failing to perfectly close the orifice *b* of the valve-seat E, by reason of the pressure of the water on the top of the valve. To remedy this, said valve D is fitted loose or free on the valve-stem *d* between stops *e e'*; also, the chamber C closed below, but provided with a discharge-opening, *f*, which is closed by a valve, H, on the lower end of the float-stem, that passes out through the opening *f*. There is also communication established by a passage or orifice, *g*, between the inlet B and the chamber, which orifice is controlled by the main valve D.

The action of these parts is as follows: Supposing the parts to be in the position represented by Fig. 1, then water freely passes by the inlet B to the trough, and the orifice *g* is closed against water passing to the under side of the valve D. The float G at first commences to rise freely, and does not lift upon the valve D till the stop *e'* strikes the bottom of the latter. A further rising of the float brings the valve D up into nearly close contact with the seat E, causes the valve H to close the aperture *f*, and the valve D to uncover the orifice *g*, all as represented in Fig. 2. Water from the inlet B, then entering the chamber C, below the valve D, by the orifice *g*, completes the raising of said valve, so that it effectually closes the opening *b* in the valve-seat E. When the water falls again in the trough, the float G, in dropping, causes the valve H to open the outlet *f*, and so permit of the water escaping from below the valve D, which, accordingly, is at liberty to move down again so soon as the stop *e* comes in contact with it.

What I claim as new, and desire to secure by Letters Patent, is—

The combination of the loose elongated cylindrical valve D, the stops *e e'* on the float-stem, the valve H, and the orifice *g*, arranged for operation in relation with each other, the valve-seat E, the chamber C, and the inlet B, substantially as specified.

JULIUS JONSON.

Witnesses:
  HENRY T. BROWN,
  MICHAEL RYAN.